United States Patent
Borkgren

(10) Patent No.: US 11,014,760 B2
(45) Date of Patent: May 25, 2021

(54) POWERED CONVEYOR SUPPORT ARM AND ROTATION DRIVE WHEEL AND CONTROL SYSTEM

(71) Applicant: Deere & Company, Moline, IL (US)

(72) Inventor: Stanley R. Borkgren, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/600,730

(22) Filed: Oct. 14, 2019

(65) Prior Publication Data

US 2021/0107744 A1 Apr. 15, 2021

(51) Int. Cl.
*B65G 41/00* (2006.01)
*A01D 90/10* (2006.01)
*B65G 67/08* (2006.01)

(52) U.S. Cl.
CPC ........... *B65G 41/002* (2013.01); *A01D 90/10* (2013.01); *B65G 67/08* (2013.01); *B65G 2201/042* (2013.01)

(58) Field of Classification Search
CPC ... A01D 90/10; B60P 1/36; B60P 1/40; B65G 41/002; B65G 67/08
USPC ........................ 198/316.1, 317, 318; 414/523
See application file for complete search history.

(56) References Cited

U.S. PATENT DOCUMENTS

| | | | |
|---|---|---|---|
| 3,498,483 A * | 3/1970 | Meharry | B60P 1/40 414/523 |
| 7,267,519 B2 | 9/2007 | Cresswell et al. | |
| 7,488,149 B2 | 2/2009 | Waldner | |
| 8,479,911 B2 * | 7/2013 | Friesen | B65G 41/002 198/313 |
| 8,622,192 B2 * | 1/2014 | Borkgren | A01C 15/003 198/312 |
| 8,662,285 B2 * | 3/2014 | Jesse | B65G 41/002 198/671 |
| 8,794,900 B2 * | 8/2014 | Friggstad | B60P 1/36 414/523 |
| 8,967,940 B2 * | 3/2015 | Petersen | B65D 88/54 414/523 |
| 8,974,170 B2 * | 3/2015 | Ryder | B65G 41/002 414/523 |
| 9,944,211 B2 * | 4/2018 | Petersen | A01C 15/003 |
| 10,150,400 B2 * | 12/2018 | Wood | B60P 1/36 |
| 2012/0243967 A1 | 9/2012 | Waldner | |
| 2020/0180493 A1 * | 6/2020 | Thompson | B65G 67/24 |

FOREIGN PATENT DOCUMENTS

WO 2010048695 A1 5/2010

* cited by examiner

*Primary Examiner* — James Keenan
(74) *Attorney, Agent, or Firm* — Joseph R. Kelly; Kelly, Holt & Christenson PLLC

(57) ABSTRACT

A conveyor support system has a primary arm and a secondary arm. The secondary arm has a generally vertical, rotatable shaft at its distal end. The vertical shaft supports pivoting of a conveyor system about the shaft. A powered wheel and tire assembly is mounted on the conveyor, under an intake end of the conveyor, and is oriented in a position to drive rotation of the conveyor about the vertical, rotatable shaft disposed at the distal end of the secondary arm. The primary arm is mounted to the agricultural machine and is configured to move the conveyor from its transport position to a position in which it can be rotated to its deployed position.

20 Claims, 16 Drawing Sheets

POWERED CONVEYOR SUPPORT ARM AND ROTATION DRIVE WHEEL AND CONTROL SYSTEM

FIELD OF THE DESCRIPTION

The present description relates to positioning a conveyor between two vehicles. More specifically, the present description relates to a power conveyor support arm and rotation drive wheel, and control system, mounted to an agricultural machine.

BACKGROUND

There are a wide variety of different types of industries where material is conveyed from a first vehicle to a second vehicle using a conveyor mechanism. For instance, it is not uncommon in the construction industry for material to be conveyed from one vehicle to another. The same is true of the agricultural industry, and a wide variety of other industries.

By way of specific example, in the agricultural industry, a variety of different materials are often conveyed between vehicles. For instance, fertilizer, seed, chemicals and other commodities are often brought into fields in a variety of different tender vehicles. The commodity is then conveyed from the tender vehicle to an implement that will be used to apply the commodity to the field being treated. Conveying the commodity from the tender vehicle to the implement often involves lining the two vehicles up, both in the side-by-side orientation and in the fore-aft orientation. This can be a cumbersome process, and it may be exacerbated by the size or complexity of the vehicles being used. For instance, wheat and fertilizer are often brought to the fields in semi hopper bottom trailers. The semi is driven near a commodity cart and multiple attempts may be needed in order to get the lateral and fore/aft positions of the cart, relative to the hopper bottom, correct.

Once the vehicles are positioned appropriately, an operator may then move a conveyance system into position between the two vehicles to perform a conveyance operation. The conveyance system may be an auger or paddle chain or belt conveyer or other type of conveyer. It may be carried by the cart or by the semi, or may be a standalone conveyor. It can have a bottom hopper that is positioned underneath the semi hopper bottom, and that receives the commodity from the semi. It may also have a spout on the top of the conveyor (the outlet end of the conveyor) that deposits the commodity into a tank on the implement. The lid on the tank is then opened, as is the door on the semi-hopper and the conveyance operation is performed.

Once the conveyance operation is completed, the conveyor may then be repositioned to fill another tank on the implement. The semi hopper bottom may also need to be repositioned if a second type of product is being conveyed. These types of operations can result in the implement, the conveyance system, and the semi (or other tender vehicle), being repositioned several times.

Some attempts have been made to power rotation of the conveyor, with hydraulic motors or cylinders. These actuators have been mounted to a central vertical support shaft so the conveyor can be rotated about that shaft. Some such systems have attempted to use primary and secondary arms to support the entire mass of the conveyor assembly during this type of rotational positioning.

The discussion above is merely provided for general background information and is not intended to be used as an aid in determining the scope of the claimed subject matter.

SUMMARY

It can be seen from the above discussion that the conveyance operation for conveying a material from a first vehicle to a second vehicle is a highly manual process that can be cumbersome and time consuming. Similarly, if the items are not positioned correctly, seed or other commodity can easily be spilled at the inlet or outlet ends of the conveyor. The operation can also take a relatively long time, especially if the implement and/or tender vehicle need to be repositioned to transfer multiple different types of material.

A conveyor support system has a primary arm and a secondary arm. The secondary arm has a generally vertical, rotatable shaft at its distal end. The vertical shaft supports pivoting of a conveyor system about the shaft. A powered wheel and tire assembly is mounted on the conveyor, under an intake end of the conveyor, and is oriented in a position to drive rotation of the conveyor about the vertical, rotatable shaft disposed at the distal end of the secondary arm. The primary arm is mounted to the agricultural machine and is configured to move the conveyor from its transport position to a position in which it can be rotated to its deployed position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, there are a wide variety of different industries in which material is conveyed between vehicles. They can include, for instance, the construction industry, the agricultural industry, and a wide variety of other industries. The present description will describe a conveyor support system used in the agricultural industry to control movement of a conveyor between a tender vehicle (such as a semi hopper bottom vehicle) and an implement (e.g., an air cart and air seeder), but this is just one example.

As also discussed above, attempts to power the rotation of a conveyor have largely failed. This is because, as the conveyor is being rotated, it may encounter an obstacle. The conveyor has a relatively large mass and thus it imparts a large momentum arm force on the motor or actuator driving rotation of the conveyor. Similarly, in current systems, primary and secondary arms are often used to support the entire mass of the conveyor assembly during positioning. This can make it difficult to position the conveyor (e.g., rotate it to a deployed position) as well.

Figure 1:
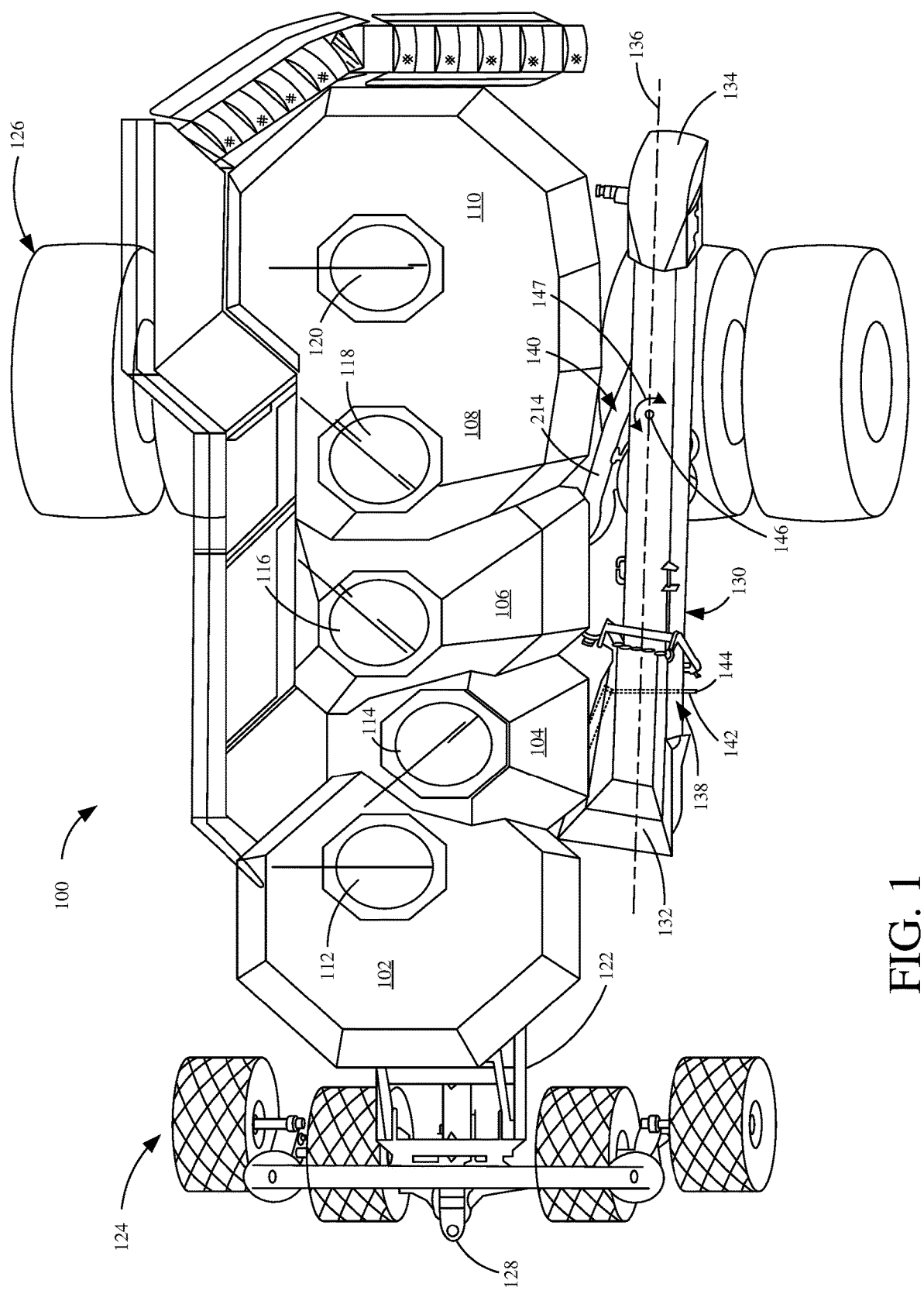
FIG. 1 is a top pictorial view of an agricultural machine that has a conveyor support system that supports a conveyor.

FIG. 1 is a top pictorial view of an agricultural machine 100. In the example shown in FIG. 1, agricultural machine 100 is an air cart that has a plurality of tanks 102, 104, 106, 108 and 110. Each tank has a lid that covers an upper opening 112, 114, 116, 118, and 120, respectively. The tanks are supported by a frame structure 122 that is also attached to ground engaging elements, such as front wheels 124 and rear wheels 126. Air cart 100 can be attached to a towing vehicle using hitch assembly 128.

FIG. 1 also shows that air cart 100 has a conveyor support system that supports a conveyor assembly 130. Conveyor assembly 130 has an intake end (or hopper) 132 and an output end (or spout) 134. Material is conveyed from hopper 132 to spout 134 by a conveyance mechanism (such as an auger, a flighted belt, etc.) generally disposed along an elongate axis 136 of conveyor assembly 130. FIG. 1 shows that machine 100 has a conveyor support assembly that includes a first support arm 138 and a second support arm 140. First support arm 138 has a pin 142 disposed at its distal end 144. Pin 142 matably engages a bore in conveyor assembly 130. Second support arm 140 supports conveyor assembly 130 generally at its center, for rotation about axis 146, generally in the directions indicated by arrow 147.

A brief description of how conveyor assembly 130 is moved from the transport position (shown in FIG. 1) to a deployed position will first be provided. Then, a more detailed description of the support arms and other items in the conveyor support system will be described in more detail.

Figure 2:
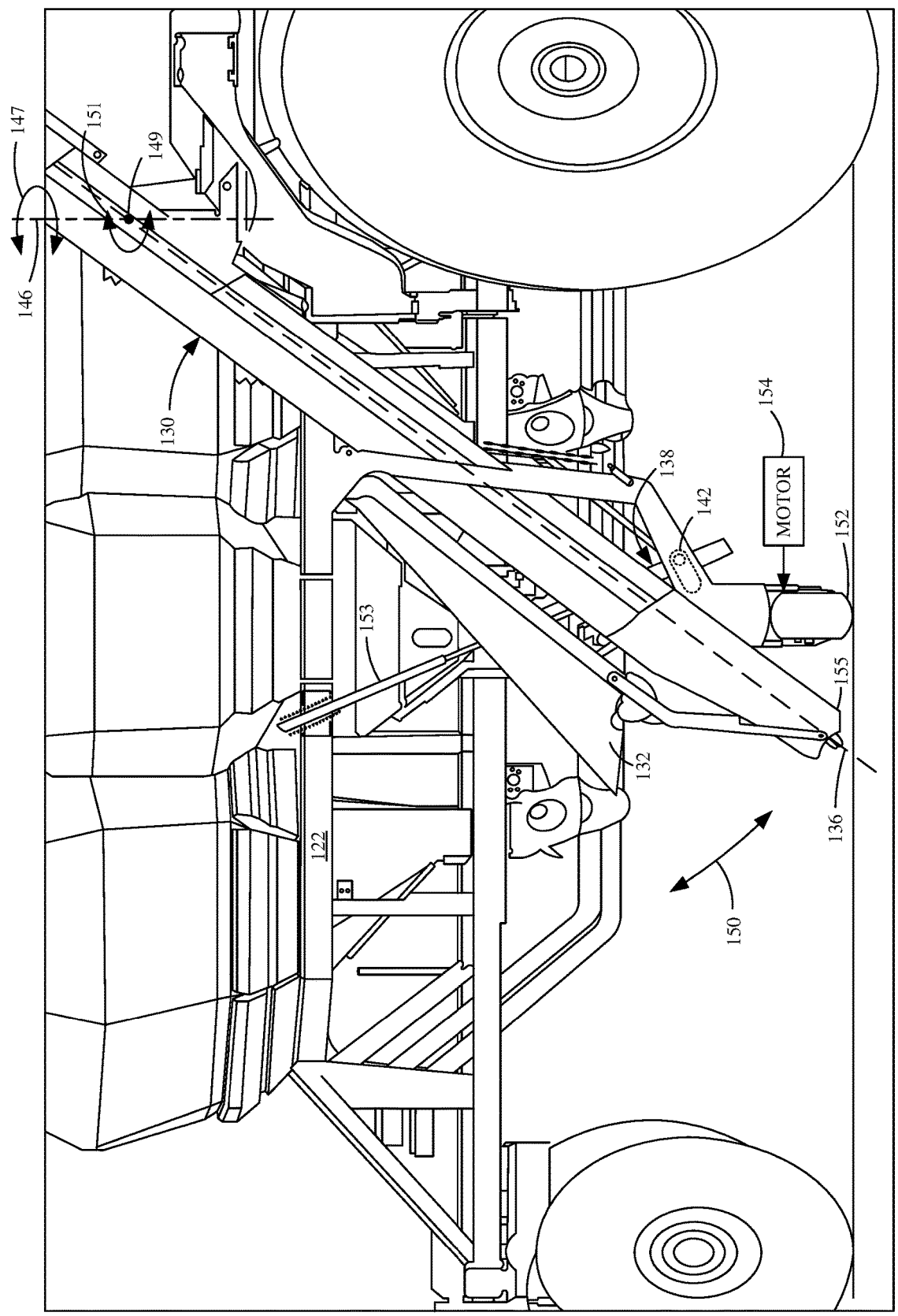
FIG. 2 is a side pictorial view illustrating operation of the conveyor support system.

FIG. 2 is a side view of vehicle 100 with conveyor assembly 130 rotated from its transport position to a lowered position. FIG. 2 shows that support arm 140 not only supports conveyor assembly 130 for rotation about axis 146, in the direction indicated by arrow 147, but it also supports conveyor assembly 130 for rotation about axis 149 generally in the direction indicated by arrow 151. Therefore, the inlet end 132 of conveyor assembly 130 can pivot in the direction inwardly and outwardly (toward and away from the frame 122 of vehicle 100) about axis 146, and it can also pivot upwardly and downwardly relative to frame 122, in the directions indicated by arrow 150, about axis 149.

FIG. 2 shows that, in order to deploy conveyor assembly 130, the intake end 132 is first pivoted downwardly toward the ground (generally in the direction indicated by arrow 150) from its raised transport position. This is done by extending cylinder 153 which moves the distal end 144 of the first support arm 138 to a lowered position. A conveyor support wheel 152 is coupled to the distal end 155 of conveyor assembly 130, generally under the hopper or inlet end 132. It is mounted in a direction generally transverse (or perpendicular) to the elongate axis 136 of the conveyor mechanism. When cylinder 153 of the first support arm 138 is extended, wheel 152 engages the ground to support the inlet end (or hopper) 132 of the conveyor assembly 130.

In the example illustrated, motor 154 is shown schematically. It can be a hydraulic motor, an electric motor, a chain drive motor, a motor mounted in the hub of wheel 152 or another motor. It illustratively receives a control signal from a control system (described in greater detail elsewhere) to power rotation of wheel 152. Thus, once the inlet end 132 of conveyor assembly 130 is rotated about axis 149 to the lowered position illustrated in FIG. 2, wheel 152 supports much of the load of conveyor assembly 130, on the ground.

Figure 3:
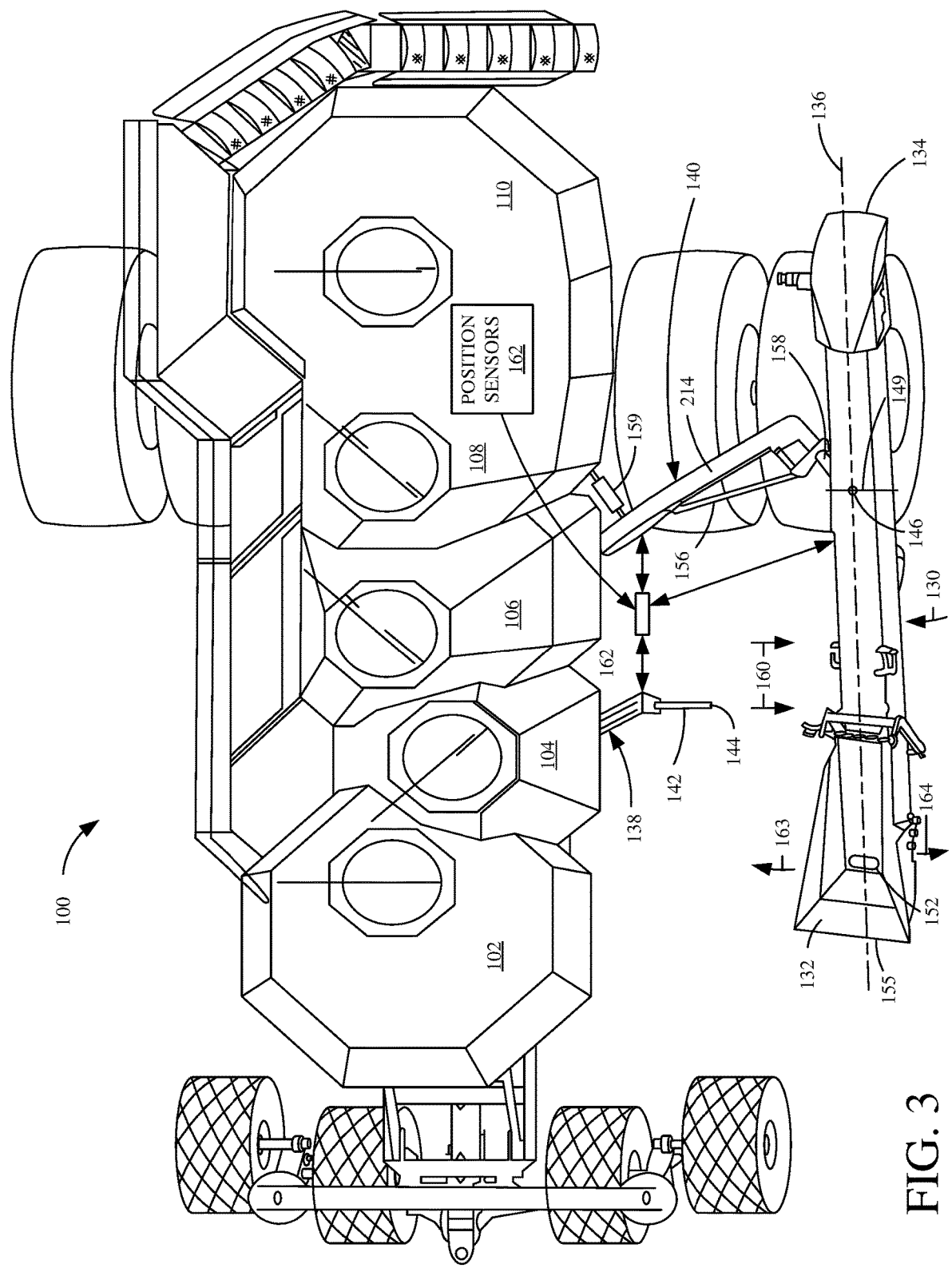
FIG. 3 is a top pictorial view of the agricultural machine illustrating the conveyor support system, after the conveyor has been lowered from its transport position.

FIG. 3 shows that the second support arm 140 also has a hydraulic cylinder (or other actuator) 156. The second support arm 140 has two arms that are joined about a vertical pivot pin. A hydraulic cylinder 159 pivots the main first elongate portion (or arm) 214 (shown in more detail in FIG. 9) with respect to the cart frame and a cylinder 156 connecting the main arm 214 and distal arm 158 rotates the distal arm 158 with respect to the main arm 214. The two cylinders 156, 159 are used to position the pivot axis 146 of the conveyor 130. By coordinating the position of these two cylinders 156, 159 the pivot axis 146 of the conveyor 130 can be adjusted along the front-to-back length of the cart 100 while maintaining a path parallel to the cart frame. When the conveyor 130 is deployed, the arm cylinders 156, 159 and the drive wheel 152 can work together to keep the conveyor 130 perpendicular to the cart 100 as it is moved to the different tank openings. The conveyor 130 does not have to be perpendicular to the cart 100, but the second support arm 140 uses two cylinders 156, 159 to position the conveyor 130 pivot axis 146 to the desired location. When cylinder 156 is extended, the distal arm portion 158 of second support arm 140 extends generally away from vehicle 100, and drive wheel 152 rotates, so that the drive wheel 152 and second support arm 140 follow a generally parallel path. This causes the conveyor assembly 130 to move away from air cart 100 generally in the direction indicated by arrows 160.

FIG. 3 also shows that, in one example, a plurality of different position sensors 162 can be disposed on or proximate arms 138 and 140 to sense the position of the arms. They can be potentiometers located at the rotatable joints of arms 138 and 140. They can be Hall Effect sensors or other sensors that sense the extent to which the hydraulic actuators are extended, or they can be other sensors. Detecting and processing the sensor signals is described in greater detail elsewhere.

Once in the position shown in FIG. 3, conveyor assembly 130 can be rotated about axis 146. This is because wheel 152 is on the ground, and it can be driven by motor 154. When driven in one direction, the inlet end 132 of conveyor assembly 130 will rotate generally in the direction indicated by first arrow 163, about axis 146. When wheel 152 rotates in the opposite direction, then the inlet end 132 of conveyor assembly 130 will rotate about axis 146 generally in the direction indicated by arrow 164.

The direction of rotation of wheel 152 will be determined based upon the type of operation that conveyor assembly 130 is to perform. If it is performing an operation in which one of the tanks 102-110 on vehicle 100 are being cleaned out, then it will rotate generally in the direction indicated by arrow 163 so that the inlet end 132 can be positioned below an outlet end of the tank that is being cleaned out. If, on the other hand, conveyor assembly 130 is to perform a fill operation in which one or more of the tanks 102-110 are to be filled, then wheel 152 will rotate in a direction to drive pivotal movement of the inlet end 132 of conveyor assembly 130 generally in the direction indicated by arrow 164, so that it can be positioned underneath the outlet of a tender vehicle (such as a semi hopper bottom vehicle). Spout 134 is now placed closely proximate the lid 118 of tank 108. The lid 118 can be removed and spout 134 can be placed over the opening to fill tank 108.

Figure 4:
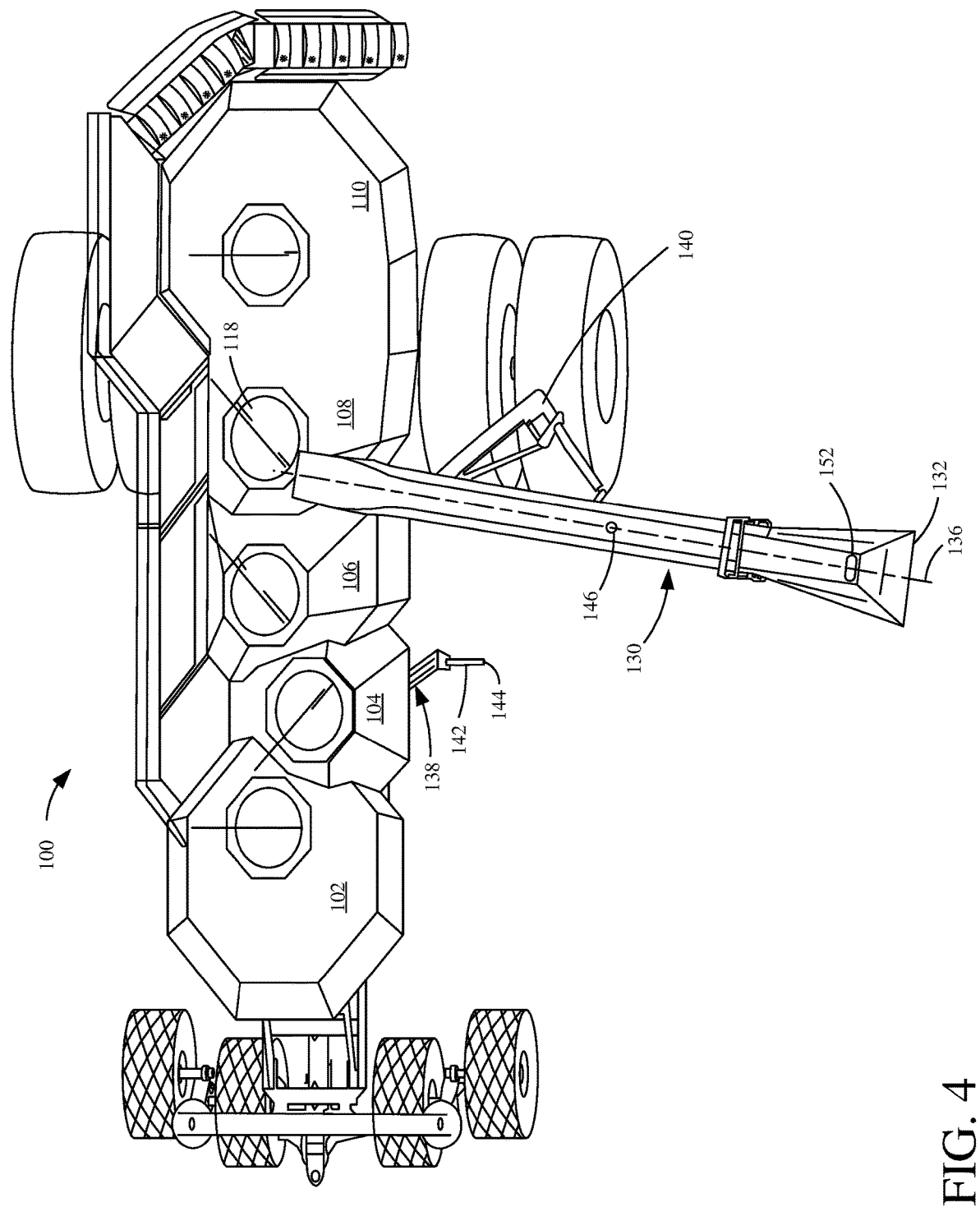
FIG. 4 is a top pictorial view of the agricultural machine with the conveyor rotated to a deployed position.
Figure 4A:
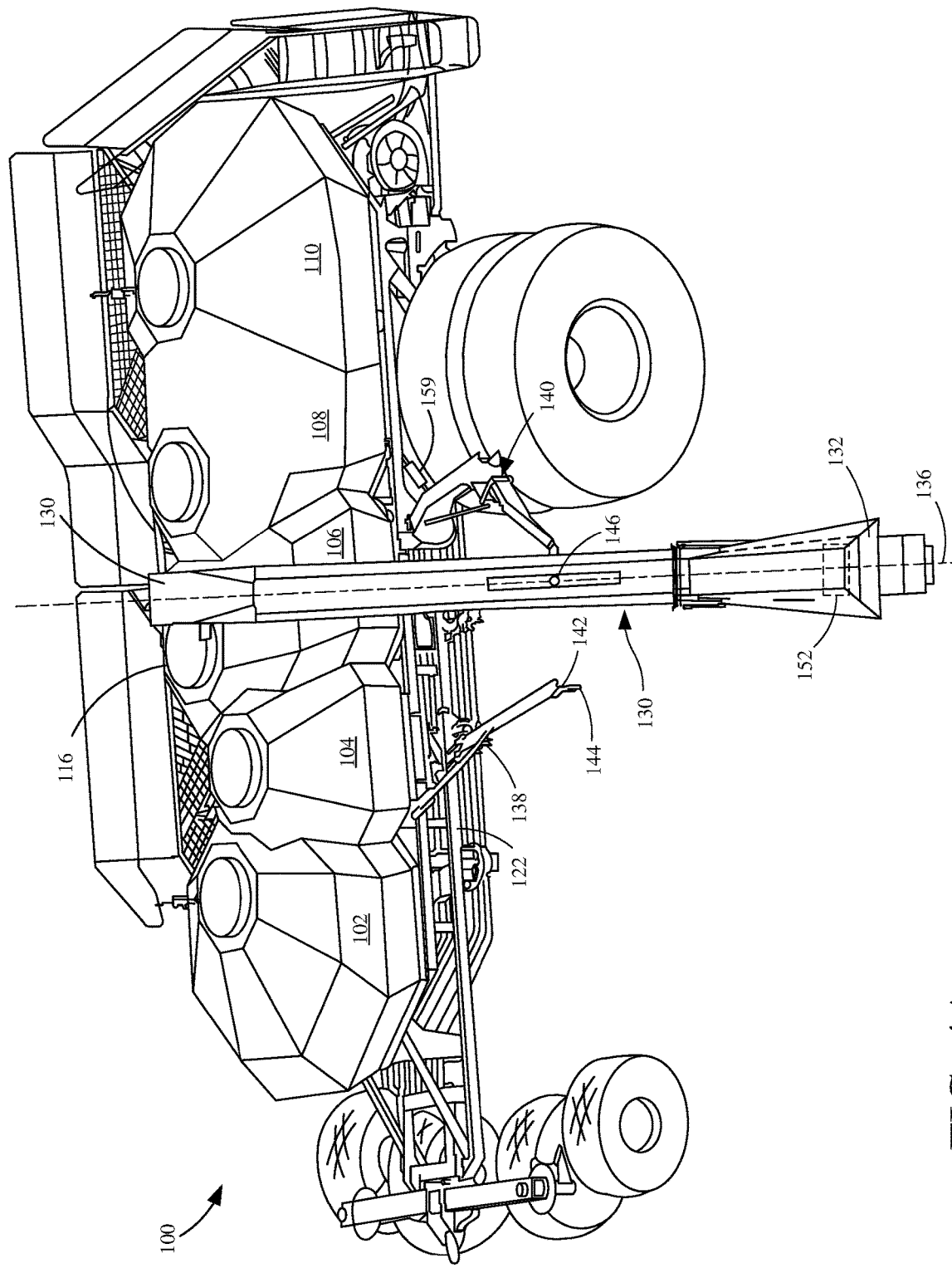
FIG. 4A is a side perspective view of the agricultural machine with the conveyor rotated to a deployed position.

FIG. 4A is a side perspective view showing conveyor assembly 130 in another deployed position. In the example shown in FIG. 4A, the spout 134 of conveyor assembly 130 is disposed closely proximate the lid 116 of tank 106. FIG. 4A also shows that arms 138 and 140 are coupled to frame 122 of vehicle 100. This is also described in greater detail elsewhere.

Figure 5:
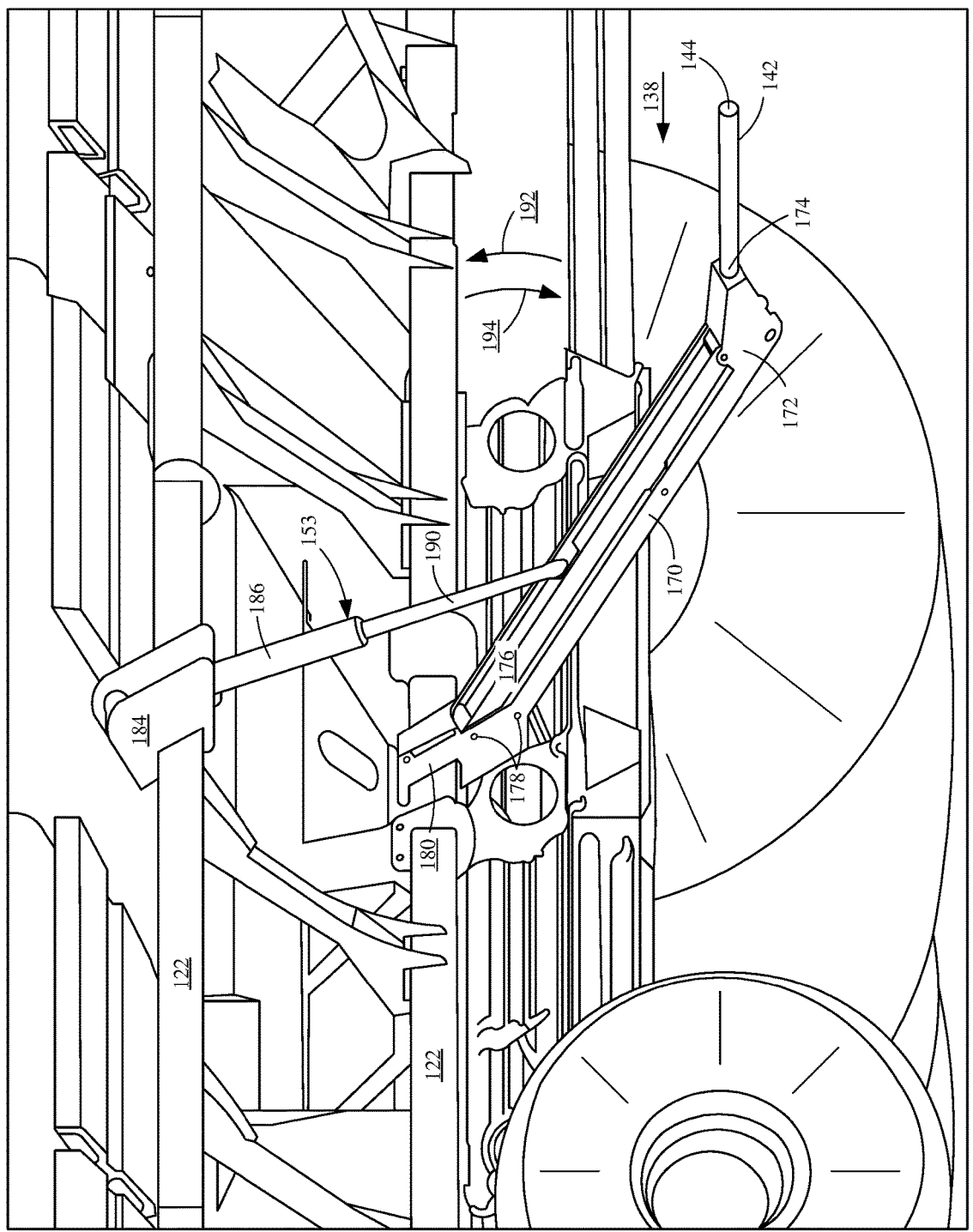
FIG. 5 is an enlarged view of a primary support arm on the conveyor support system in a lowered position.

FIG. 5 is a more detailed pictorial illustration of first support arm 138. Arm 138 has a first elongate section 170 that has a distal end 172 connected to a proximal end 174 of pin 142. The proximal end 176 of elongate portion 170 is pivotally mounted, about pivot axis 178, to a connection member 180 that connects pivot axis 178 to frame 122. The elongate portion 170 is a 4-bar mechanism so that pin 142 remains generally parallel to the ground as it lifts the conveyor 130. Pivot 178 thus has two pivot axes (although they are collectively referred to herein as pivot axis 178). The distal end 172 also has two axes (although they are collectively referred to herein as pivot axis or distal end 172). A second connection portion 184 connects a first end 186 of cylinder 153 to frame 122. The second end 190 of cylinder 153 is pivotally connected to the elongate member 170. Therefore, as cylinder 153 is retracted, this drives movement of elongate member 170, about pivot axis 178, generally in the direction indicated by arrow 192. As cylinder 153 is extended, it drives movement of the elongate member 170, about pivot axis 178, generally in the direction indicated by arrow 194. When cylinder 153 is retracted, this causes pin 142 to lift upwardly toward its transport position. When cylinder 153 is extended, it causes pin 142 to move downwardly, so that the drive wheel 152 on the hopper 132 of conveyor assembly 130 (shown in FIG. 2), is in contact with the ground.

Figure 6:
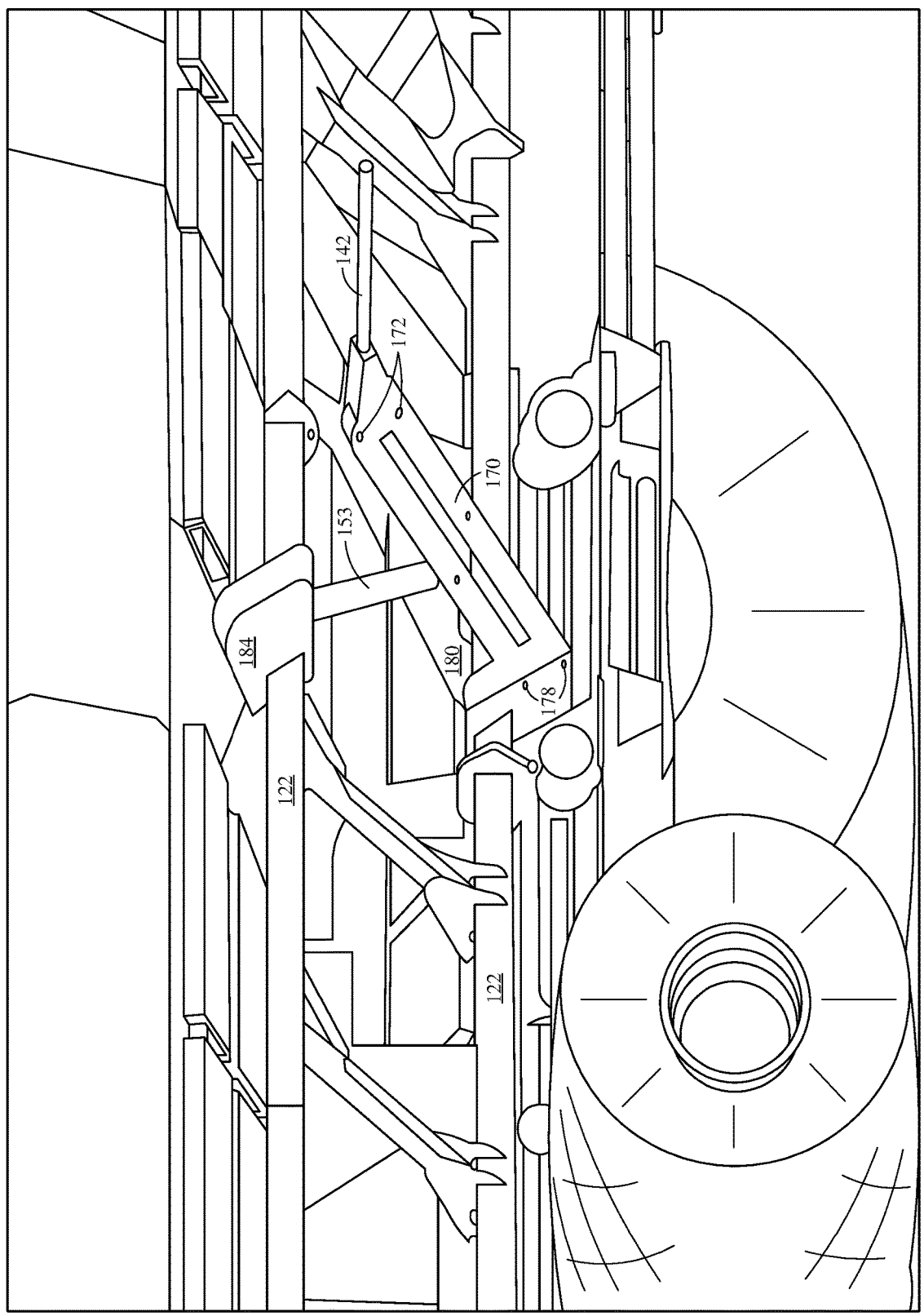
FIG. 6 is a side pictorial view of the primary support arm of the conveyor support system, in its raised, transport position.

FIG. 6 is an enlarged pictorial illustration of arm 138 as well, and similar items which are similar to those shown in FIG. 5 are similarly numbered. However, FIG. 6 shows that cylinder 153 is now fully retracted. This causes elongate portion 170 to rotate about pivot axis 178 so that pin 142 is lifted into its transport position.

As briefly discussed above with respect to FIG. 3, one or more different sensors can be disposed on arm 138 to detect its position. In one example, a Hall Effect sensor, or other sensor, is disposed on cylinder 153 to detect the extent to which it is extended or retracted relative to its full range of motion. This, along with knowing the dimensions of arm 138, will provide an indication as to the position of pin 142 relative to its transport position (shown in FIG. 6) and its lowered position (shown in FIG. 5). In another example, potentiometers or other sensors can be placed at the pivot axes 178. These sensors can provide an indication as to the rotational position of elongate member 170 about pivot axis 178. Again, this can provide an indication of the position of pin 148 relative to its lowered position (FIG. 5) and transport position (FIG. 6). These are just examples, and other sensors can be used as well.

Figure 7:
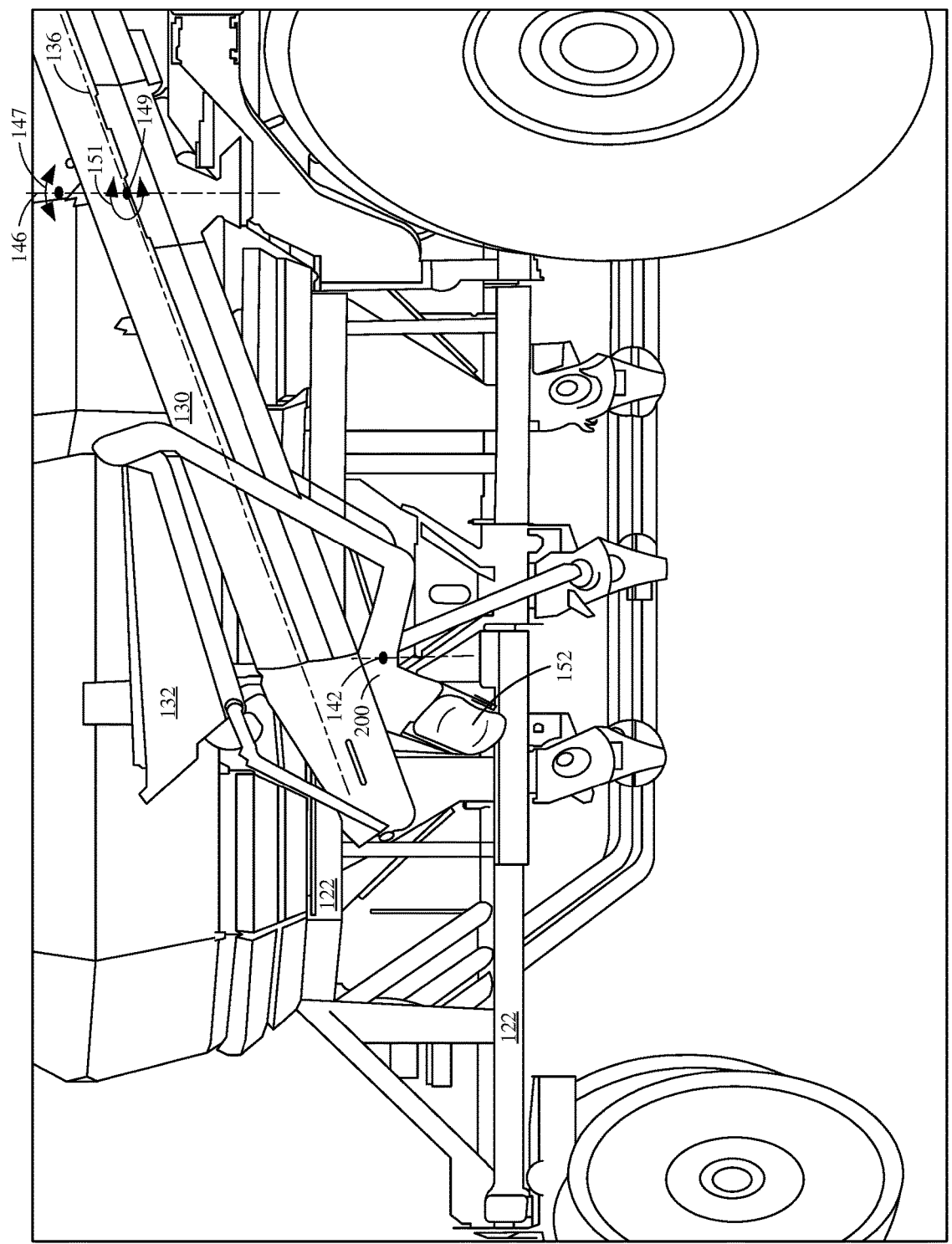
FIG. 7 is a side pictorial view of the agricultural machine, showing the primary support arm raised to its transport position, while supporting the conveyor.
Figure 8:
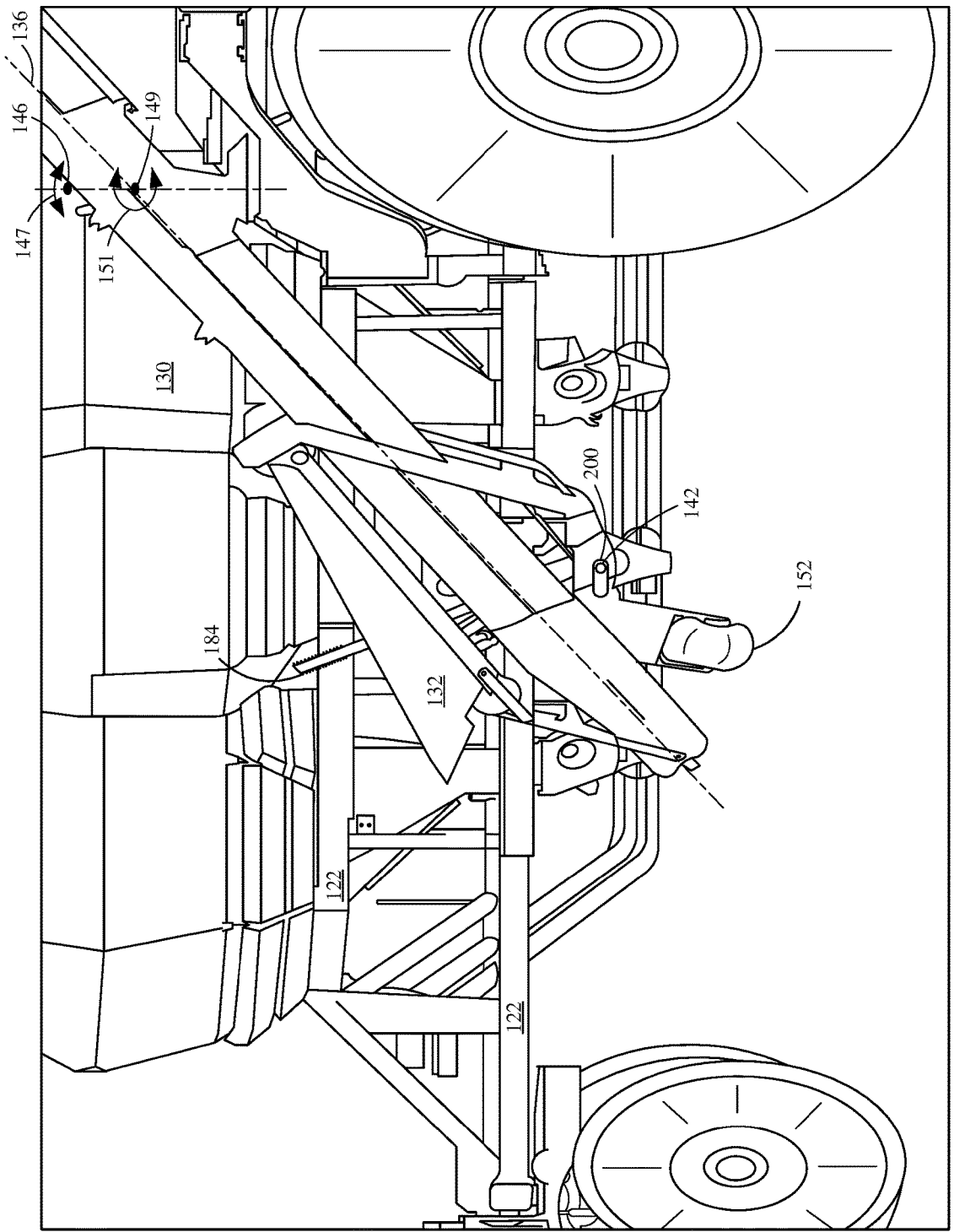
FIG. 8 is a side pictorial view showing the primary support arm partially lowered from the transport position.

FIGS. 7 and 8 are side pictorial views of machine 100, and the front portion of conveyor assembly 130, in two different positions. FIG. 7 shows conveyor assembly 130 when it is coupled to pin 142 on support arm 138, with cylinder 153 on support arm 138 retracted to the transport position (which is also illustrated in FIGS. 1 and 6).

FIG. 7 shows that, in one example, where conveyor assembly 130 is in its transport position, pin 142 is illustratively received within a channel 200. Therefore, it can travel back and forth within that channel, while still being raised and lowered.

FIG. 8 shows that the cylinder 153 that powers arm 138 has been extended to a position between the transport position (shown in FIG. 7) and the lowered position (shown in FIG. 5). It can be seen that wheel 152 is now closer to the ground surface than it is when in the transport position shown in FIG. 7. This is because hopper 132 has been rotated downwardly, generally about axis 149, toward the ground. FIG. 8 also shows that pin 142 has now slid within channel 200 from the position shown in FIG. 7.

Figure 9:
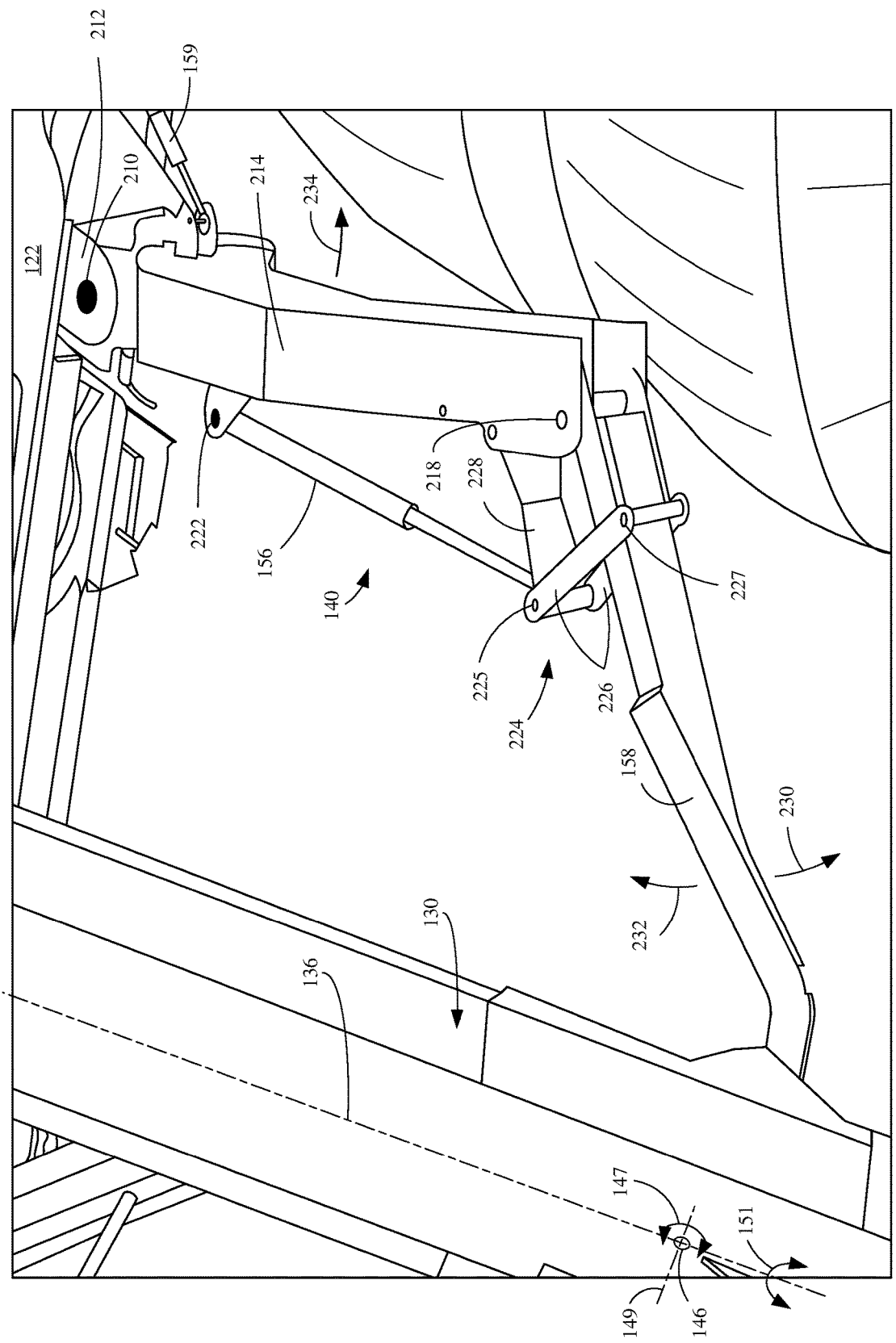
FIG. 9 is an enlarged pictorial illustration of the secondary support arm.

FIG. 9 shows a more detailed view of one example of support arm 140. Arm 140 is pivotally connected to frame 122 at pivot axis 210. Cylinder 159 can be actuated to move the first elongate portion (or main arm) 214 relative to frame 122. Pivot axis 210 can be defined by a bracket 212 that pivotally mounts a first elongate portion 214. Elongate portion 214 is pivotally mounted to the second elongate portion (or distal arm) 158 generally about pivot axis 218. A cylinder 156 is pivotally mounted to the first elongate portion 214 about pivot axis 222, and it is pivotally mounted to the second elongate portion 158 through linkage 224. Linkage 224 illustratively includes a set of parallel links 226 that are pivotally coupled to a lever member 228 at pivot axis 225 and to elongate portion 158 at pivot axis 227. As cylinder 156 extends, it causes lever member 228 to move parallel links 226 generally outwardly, to move elongate portion 158 generally in the direction indicated by arrow 230. As cylinder 156 retracts, it causes lever 228 to move parallel linkages 226 to move elongate portion 158 generally in the direction indicated by arrow 232. This causes elongate portion 158 to fold inwardly, toward elongate portion 214, thus moving the pivot axis 146, about which conveyor assembly 130 is pivotally mounted, inwardly toward the frame 122 of machine 100. Similarly, as axis 146 moves inwardly, cylinder 159 can be actuated to cause the first elongate portion 214 to fold inwardly toward frame 122 generally in the direction indicated by arrow 234.

Therefore, referring again to FIG. 1, it can be seen that the first elongate portion of arm 140 is folded generally rearwardly, and inwardly, toward frame 122 of machine 100.

As with support arm 138, support arm 140 can have one or more different sensors that can generate sensor signals that indicate the position of support arm 140, relative to its transport position (shown in FIG. 1) and its deployed position (shown in FIG. 9). For instance, a Hall Effect sensor or other sensor can be disposed on cylinders 156 and 159 to indicate the degree to which cylinders 156 and 159 are extended and retracted. Similarly, a rotational or other sensor can be disposed relative to the rotational or pivot axes 210, 218, 225 and/or 227 to indicate the extent to which elongate portions 214 and 158 are rotated about those axes.

This, along with the dimensions of arm 140, provides an indication of the position of arm 140 relative to its transport and deployed positions.

It can thus be seen that neither of the support arms 138 or 140 support the full load of conveyor assembly 130. Instead, both arms support conveyor assembly 130 in its transport position and as it is moved between its transport position and lowered position. However, once conveyor assembly 130 is moved to its lowered position (shown in FIG. 2), then it can be disengaged from arm 138 so support arm 140 and drive wheel 152 support the conveyor assembly 130. This greatly reduces the inertial moment exerted on either support arm 140 or drive wheel 152, because they are both supporting conveyor assembly 130, as it is moved into its deployed position, as it operates, and as it is returned to the lowered position where arm 138 again engages and supports conveyor assembly 130.

Figure 10:
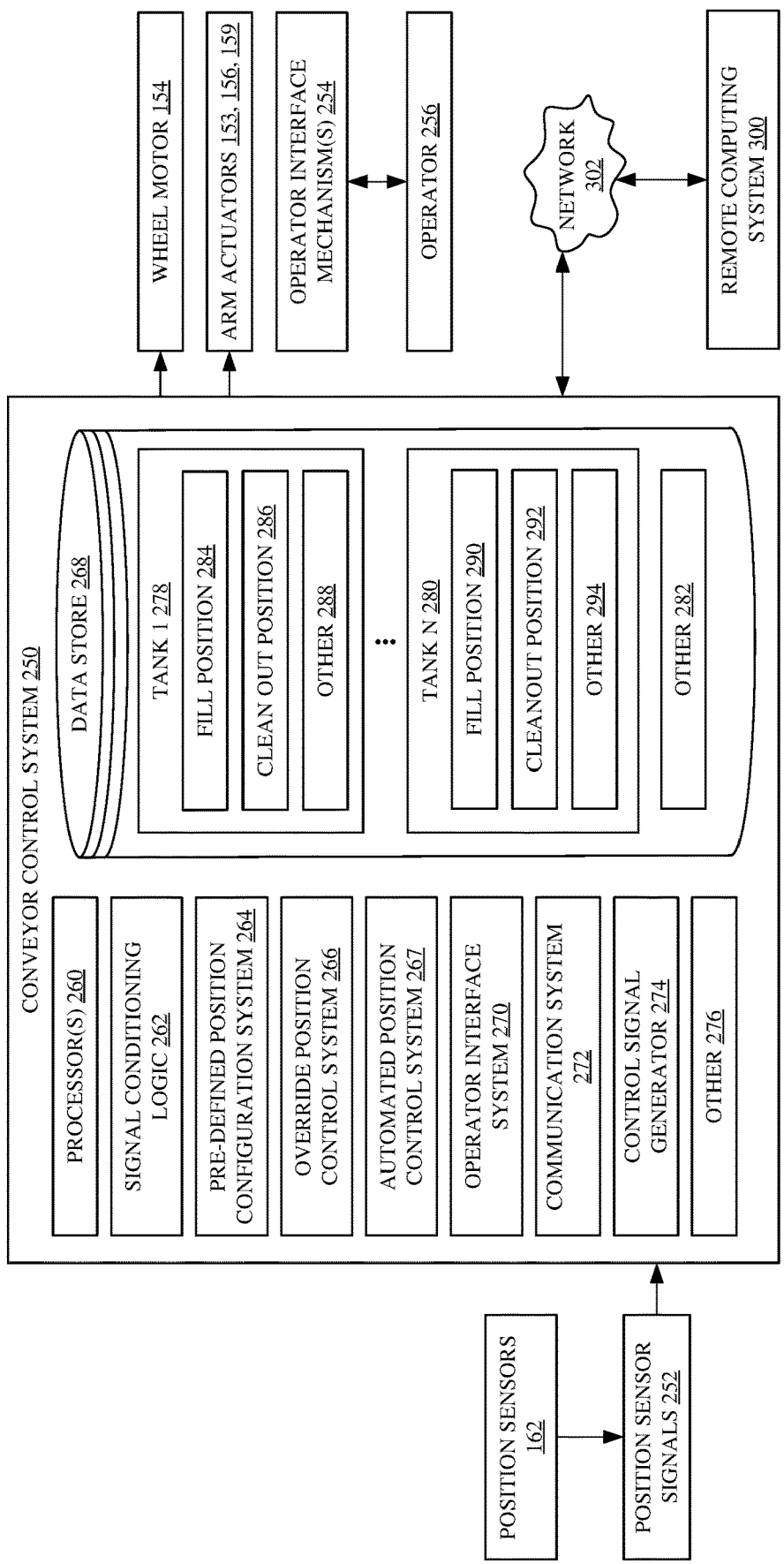
FIG. 10 is a block diagram showing one example of a conveyor control system.

FIG. 10 is a block diagram showing one example of a conveyor control system 250. Conveyor control system 250 can be disposed on machine 100. It can be disposed on a towing vehicle that tows machine 100. It can be disposed on a mobile device that is carried by an operator, it can be distributed among different locations, etc. In the example shown in FIG. 10, conveyor control system 250 is shown receiving position sensor signals 252 from position sensors 162. Recall that position sensors 162 are disposed on the conveyor support system described with respect to previous figures, so that the position of the conveyor support system can be determined. For instance, the sensor signals can be used to determine the extent to which hydraulic cylinders are extended. The sensor signals can indicate the angular position of different portions of the support arms 138 and 140 relative to one another, they can indicate the position of the hopper 132 and spout 134 relative to different positions of machine 100, etc.

FIG. 10 also shows that conveyor control system 250 generates control signals to control wheel motor 154, one or more of the various actuators 153, 156 and 159, and it can generate signals that are output to operator interface mechanisms 254, and receive input signals that are input from operator interface mechanisms 254, based upon interactions by operator 256. Operator interface mechanisms 254 can, for example, include a display device, an audio device, a haptic feedback device, or other output mechanisms that provide an output for operator 256. Similarly, they can include buttons, joysticks, levers, a touch sensitive display on which touch gestures can be used to actuate displayed links, icons, buttons, or other things.

In one example, conveyor control system 250 receives the position sensor signals 252 and it also receives control inputs that are provided by operator 256 through operator interface mechanisms 254. The control inputs can be used by conveyor control system 250 to control wheel motor 154 and arm actuators 153, 156, 159, to move conveyor assembly 130 into a desired position, as commanded by operator 256. In another example, conveyor control system 250 can receive pre-programmed positions and when one of those positions is selected (such as by operator 256 through operator interface mechanism 254), conveyor control system 250 can automatically generate control signals for wheel motor 154 and arm actuators 153, 156, 159 to position conveyor assembly 130 in the pre-defined positions. For instance, it may be that the positions can be programmable or pre-settable by operator 256. They can also illustratively be downloadable from a remote computing system 300 over a network 302 or otherwise programmed into conveyor control system 250.

By way of example, and again referring to FIG. 1, assume that one of the preset positions is a fill position for filling tank 102. Assume that another preset position is a fill position for filling tank 104. Assume that there are also preset positions for cleaning out tanks 102 and 104. There may also be preset positions for filling and cleaning out the other tanks 106, 108 and 110 as well. In one example, in order to obtain position information defining those positions, operator 256 first controls conveyor control system 250 to move conveyor assembly 130 to one of the desired positions (such as the fill position for tank 102). Once conveyor assembly 130 is in that position, then operator 256 can actuate a save actuator so that the position information (e.g., the value of the position sensor signals 252) is saved. Thus, the operator 256 may be provided an option to select that pre-defined position, at a later time. When the operator selects that position, conveyor control system 250 can automatically control wheel motor 154 and arm actuators 153, 156, 159, to move the conveyor assembly 130 to that pre-defined position. The same can be done for a plurality of other pre-defined positions as well. Those pre-defined positions may be selectable by operator 256 so that conveyor control system 250 automatically moves conveyor assembly 130 to the selected, pre-defined position.

Some of the items in conveyor control system 250 will now be described in more detail. In one example, conveyor control system 250 illustratively includes one or more processors 260, signal conditioning logic 262, pre-defined position configuration system 264, override position control system 266, automated position control system 267, data store 268, operator interface system 270, communication system 272, control signal generator 274, and it can include a wide variety of other items 276. Data store 268 can include information indicative of a plurality of pre-defined positions. For instance, in the example shown in FIG. 10, data store 268 includes data defining a plurality of pre-defined positions for tank 1, as indicated by block 278. It can include data defining a plurality of pre-defined positions for a number of different tanks, as indicated by block 280. It can of course include other items 282.

The pre-defined positions for tank 1, illustrated by block 278, include a pre-defined fill position 284, a pre-defined cleanout position 286, and it can include other pre-defined positions 288. The pre-defined positions for tank N (indicated by block 280) can include a pre-defined fill position 290, a pre-defined cleanout position 292, and it can include other pre-defined positions 294 as well.

In operation, operator interface system 270 illustratively generates outputs on operator interface mechanisms 254 and detects user interaction with the operator interface mechanisms 254. It can generate a signal indicative of those user interactions and provide it to other items in conveyor control system 250. When operator interface mechanisms 254 are on mobile devices or other remote devices, communication system 272 illustratively communicates with those devices. Similarly, it may be that conveyor control system 250 receives the pre-defined positions 278 and 280 by downloading them from remote computing system 300 over network 302. In such an example, communication system 272 is configured for communication over network 302. Network 302 may be a controller area network, a local area network, a wide area network, a cellular communication network, a near field communication network, or any other of a wide variety of networks or combinations of networks. Thus, the type of communication system 272 provided on conveyor control system 250 may vary based upon the type of networks it will be communicating with.

Signal conditioning logic 262 illustratively receives the position sensor signals 252 and can perform conditioning operations on those signals. The conditioning operations can include amplification, filtering, linearization, normalization, etc.

Pre-defined position configuration system 264 allows operator 256 to enter a configuration mode by providing an input through operator interface mechanisms 254. When that happens, pre-defined position configuration system 264 illustratively guides operator 256 through a user experience that allows operator 256 to set the pre-defined positions that can be stored in data store 268. Override position control system 266 illustratively allows operator 256 to provide inputs through operator interface mechanisms 254 in order to control the position and operation of conveyor assembly 130. Thus, pre-defined position configuration system 264 can generate an interface that allows operator 256 to use override position control system 266 to actuate actuators 153, 156, 159, and wheel motor 154, to move conveyor assembly 130 to a position that is to be stored as a pre-defined position. Pre-defined position configuration system 264 then allows operator 256 to name that position, and to store it in data store 268. This can be repeated for any number of desired, pre-defined positions.

Automated position control system 267 illustratively uses operator interface system 270 to generate an output on operator interface mechanisms 254 that allows operator 256 to select one or more of the pre-defined positions and to start automated positioning of conveyor assembly 130 into a selected one of those positions. Thus, it may be that a set of selectable position indicators are displayed for operator 256 on a touch sensitive display screen. The operator can select one of the pre-defined positions by touching it, and then can initiate the automated positioning of conveyor assembly 130, into that selected position, by touching a start actuator, or in another way. When that is done, automated position control system 267 illustratively provides outputs to control signal generator 274 to control wheel motor 154 and arm actuator 153, 156, 159, to begin moving conveyor assembly 130 to the selected, pre-defined position. Automated position control system 267 monitors the position sensor signals 252, as conveyor assembly 130 is moving. It can thus vary the signals provided to control signal generator 274, so that it can control wheel motor 154 and actuators 153, 156, 159, accordingly.

Operator 256 can also illustratively use override position control system 266 to fine tune the position, or to otherwise adjust the position, of conveyor assembly 130. For instance, it may be that the intake end 132 of conveyor assembly 130 is not positioned properly under a semi hopper bottom vehicle. In that case, operator 256 can adjust the position of conveyor assembly 130 using operator input mechanisms to invoke override position control system 266.

Similarly, it may be that the transport position is also a pre-defined position. In that case, the operator 256 may be provided with an output that allows the operator to select the transport position. At that point, automated position control system 267 can use control signal generator 274 to control wheel motor 154 and arm actuators 153, 156, 159, to move conveyor assembly 130 back to the transport position, automatically.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
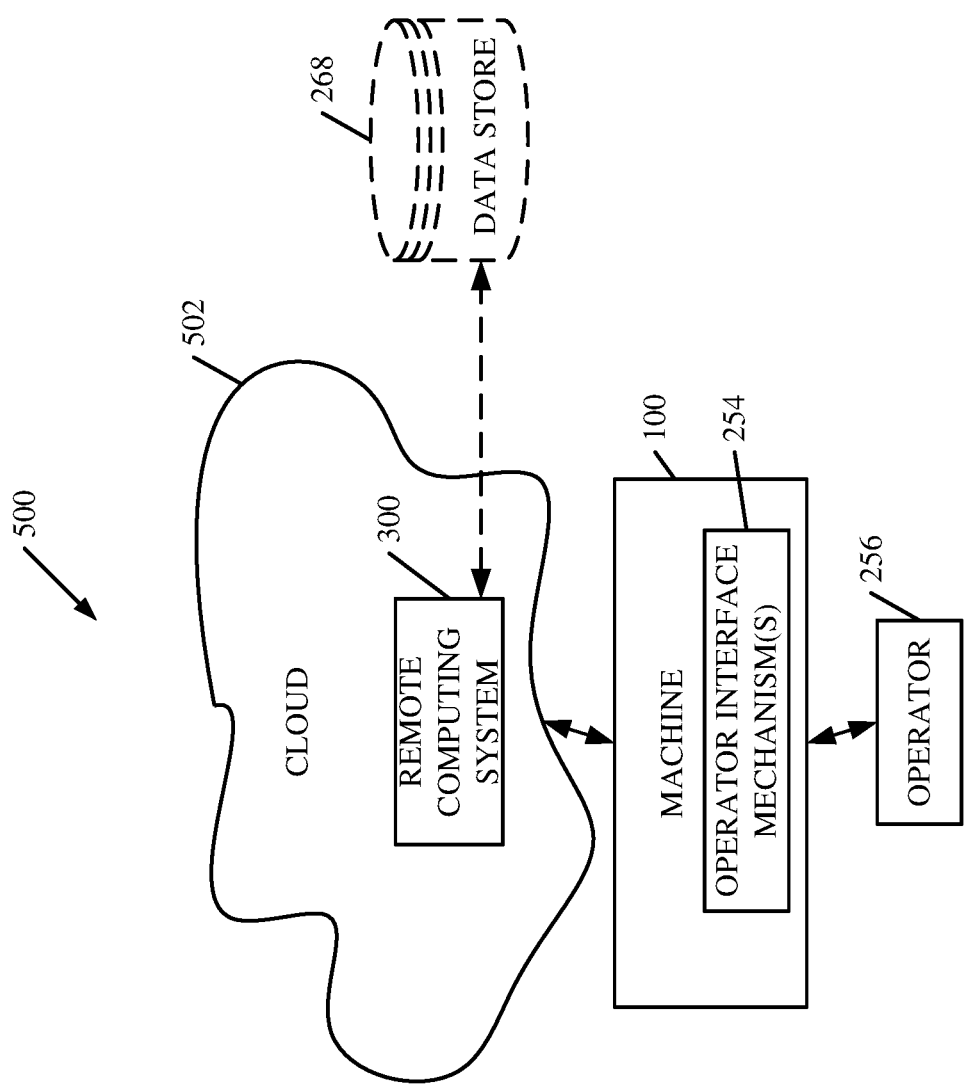
FIG. 11 is a block diagram showing the conveyor control system in a remote server architecture.

FIG. 11 is a block diagram of machine 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 10 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIG. 10 and they are similarly numbered. FIG. 11 specifically shows that remote computing system 300, and data store 268 and other items can be located at a remote server location 502. Therefore, machine 100 accesses those systems through remote server location 502.

FIG. 11 also depicts another example of a remote server architecture. FIG. 11 shows that it is also contemplated that some elements of FIG. 10 are disposed at remote server location 502 while others are not. By way of example, data store 268 or other items can be disposed at a location separate from location 502, and accessed through the remote server at location 502. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machine is towed by a towing vehicle close to the fuel truck for fueling, the system automatically collects the information from the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machine until the machine enters a covered location. The machine, itself, can then send the information to the main network.

It will also be noted that the elements of FIG. 10, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
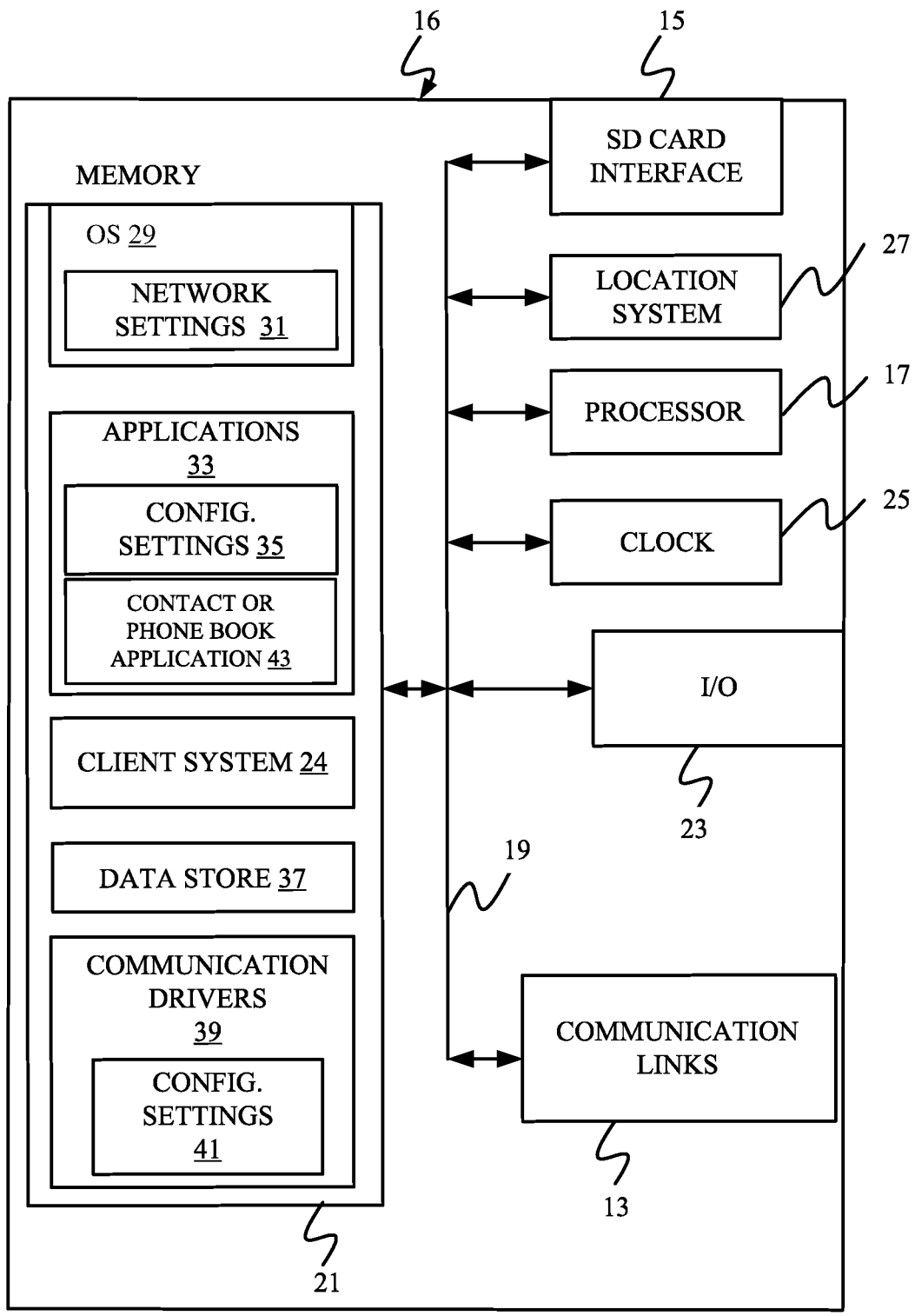
FIGS. 12-14 show examples of mobile devices that can be used as an operator interface mechanism.
Figure 13:
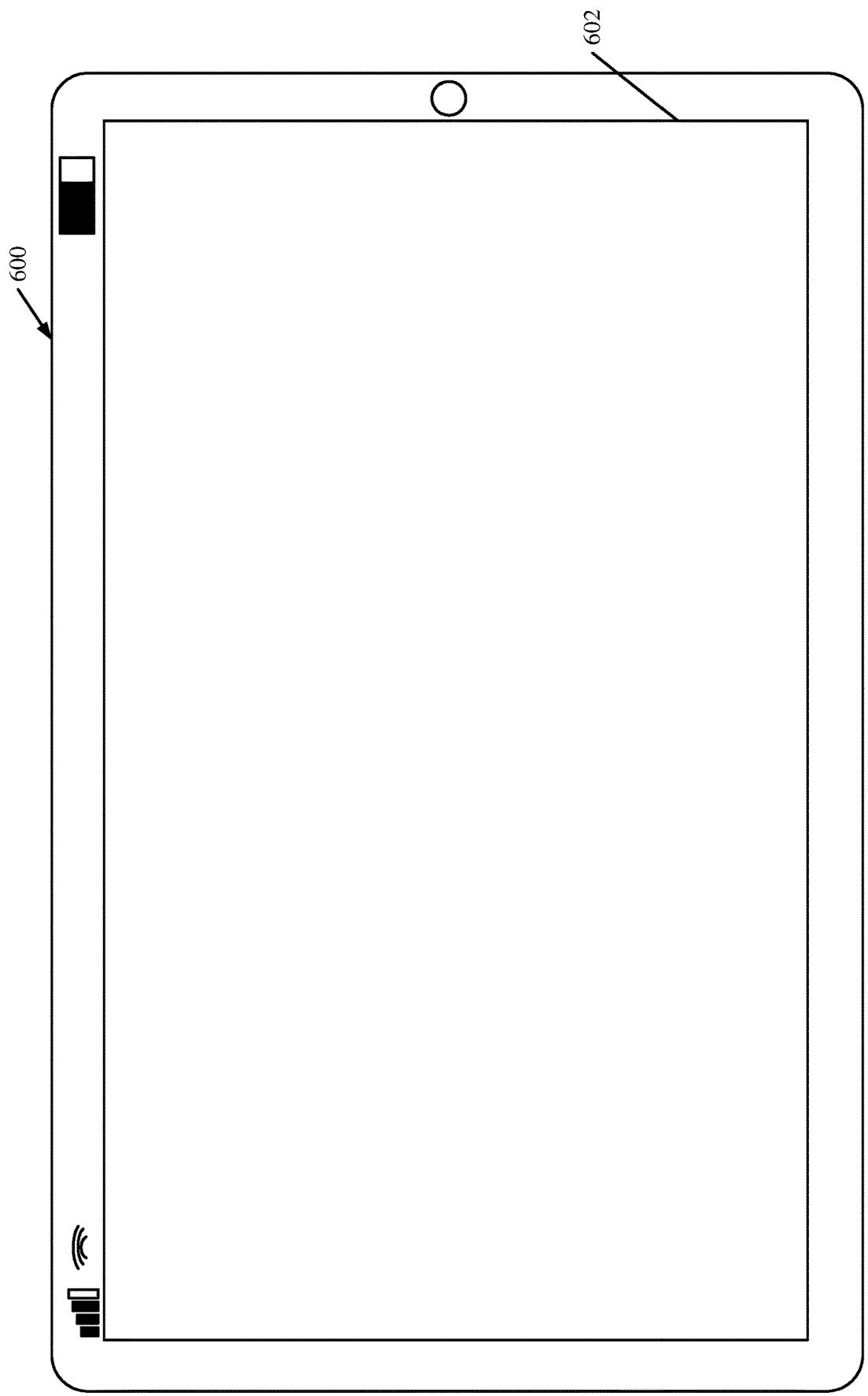
Figure 14:
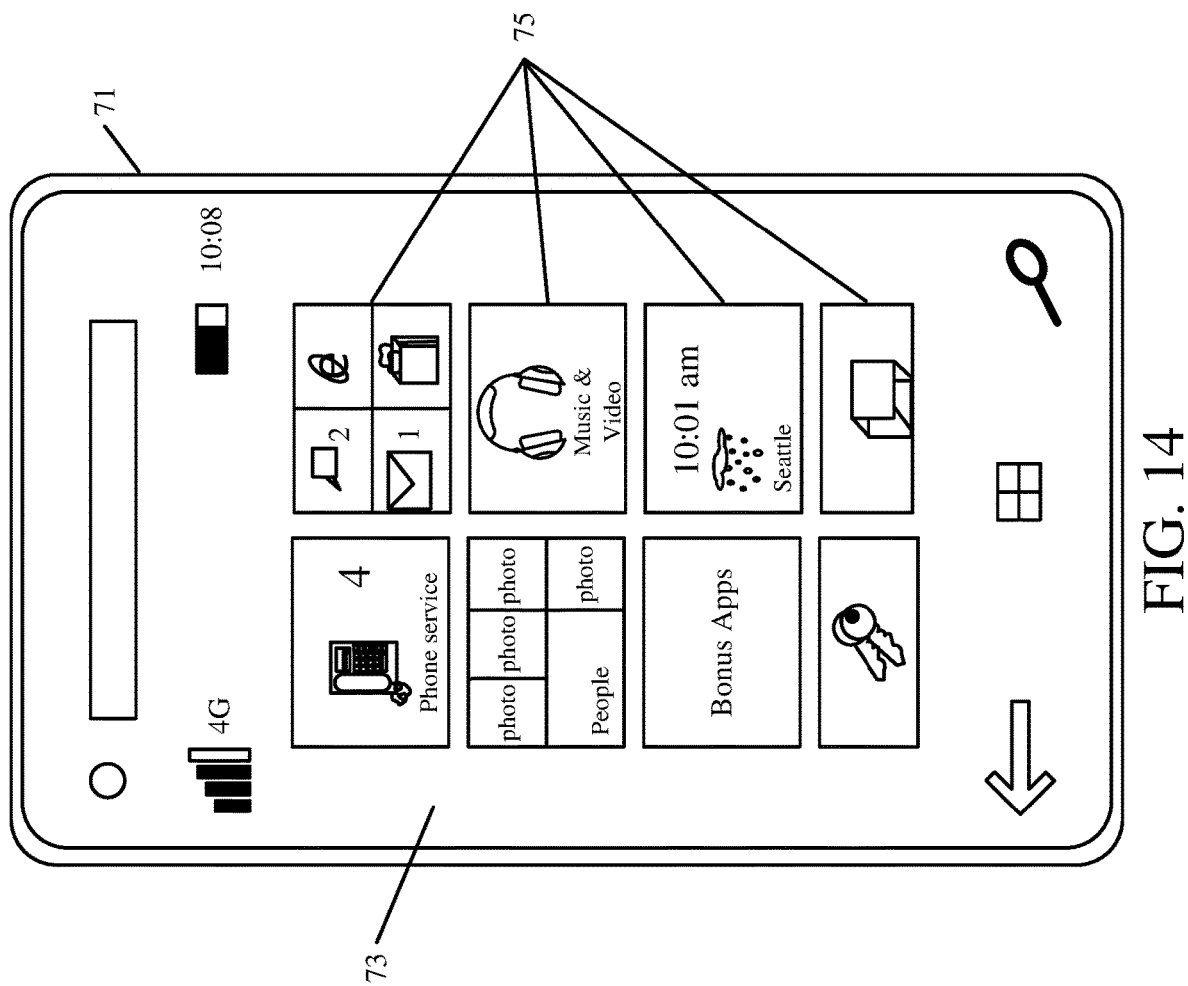

FIG. 12 is a simplified block diagram of one illustrative example of a handheld or mobile computing device that can be used as a user's or client's hand held device 16, in which the present system (or parts of it) can be deployed. For instance, a mobile device can be carried by an operator or deployed in the operator compartment of a towing vehicle for use in positioning conveyor assembly 130. FIGS. 13-14 are some examples of handheld or mobile devices.

FIG. 12 provides a general block diagram of the components of a client device 16 that can run some components shown in FIG. 10, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processor 260 from FIG. 10) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 600. In FIG. 13, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
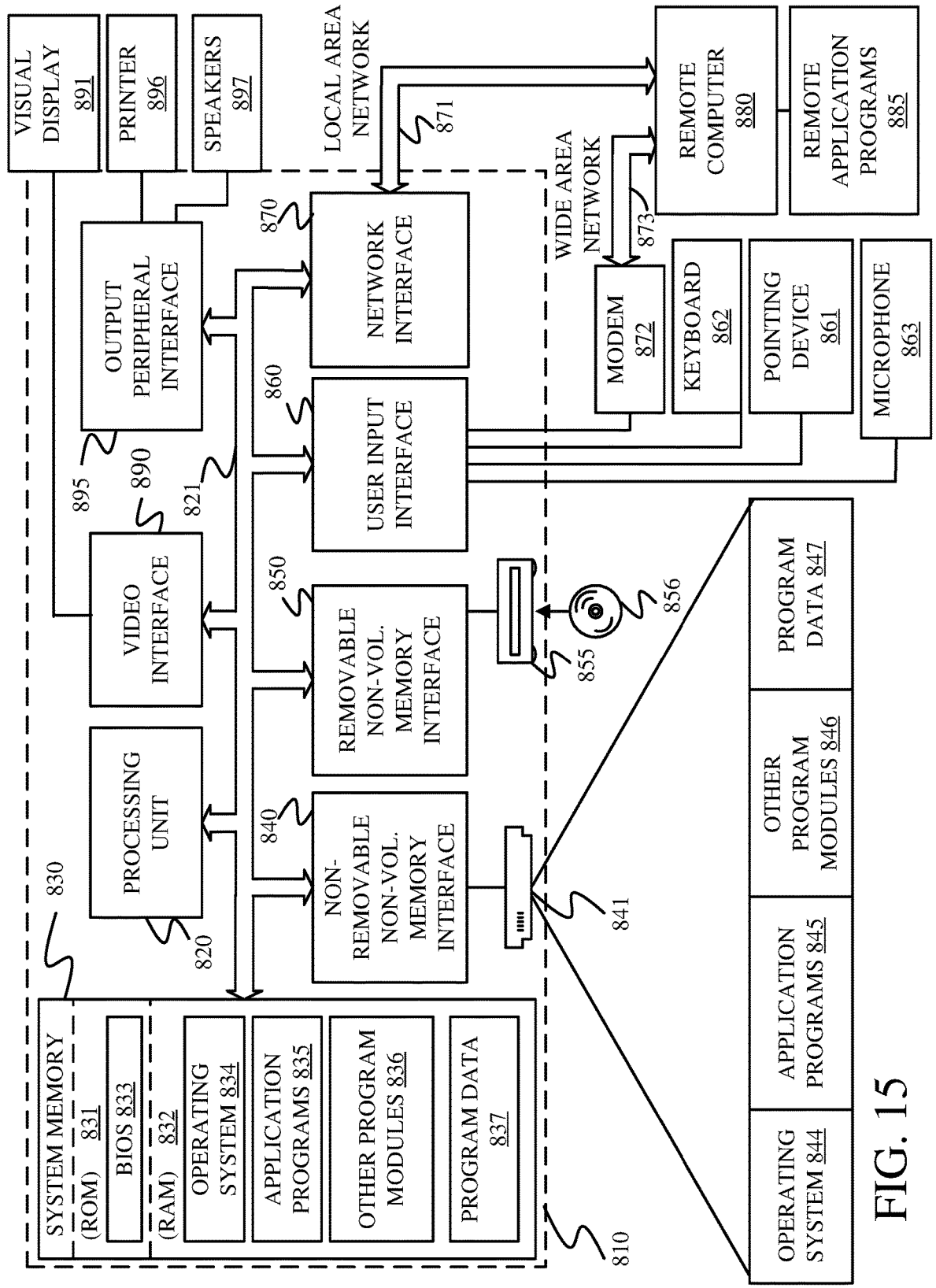
FIG. 15 is a block diagram showing one example of a computing environment that can be used in the conveyor control system illustrated in FIG. 10.

FIG. 15 is one example of a computing environment in which elements of FIG. 10, or parts of it, (for example) can be deployed. With reference to FIG. 15, an example system for implementing some embodiments includes a computing device in the form of a computer 810 programmed to perform as set out above. Components of computer 810 may include, but are not limited to, a processing unit 820 (which can comprise processor 260), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 10 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 15 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a conveyor support system, comprising:

a first support arm having a first end coupled to a frame of an agricultural vehicle and having a second end that removably engages a first portion of a conveyor assembly that conveys material relative to a tank on the agricultural vehicle;

a first actuator that moves the second end of the first support arm between a raised, transport position and a lowered position;

a second support arm having a first end coupled to the frame of the agricultural vehicle and a second end pivotally coupled to a second portion of the conveyor assembly, the conveyor assembly being pivotal relative to the second support arm, in a first direction, about a first pivot axis and in a second direction, about a second pivot axis;

a second actuator that moves the second end of the second support arm between a retracted, transport position, in which the second end of the second support arm is closely proximate the agricultural vehicle, and a deployed position in which the second end of the second support arm is further spaced from the agricultural vehicle than when in the retracted, transport position;

a ground engaging element coupled to the first portion of the conveyor assembly and, when the first actuator moves the second end of the first support arm to the lowered position, the ground engaging element engages a support surface; and a motor coupled to drive the ground engaging element in a drive direction, when the ground engaging element is in contact with the support surface, so the first portion of the conveyor assembly disengages from second end of the first support arm.

Example 2 is the conveyor support system of any or all previous examples and further comprising:

a material receiving hopper coupled to the first portion of the conveyor assembly.

Example 3 is the conveyor support system of any or all previous examples wherein the conveyor assembly comprises an outlet end and conveys the material generally along an elongate axis from the material receiving hopper to the outlet end, and wherein the ground engaging element is mounted to the first portion of the conveyor assembly so the drive direction is generally transverse to the elongate axis.

Example 4 is the conveyor support system of any or all previous examples wherein, when the motor drives movement of the ground engaging element in the drive direction, the ground engaging element drives pivotal movement of the conveyor assembly relative to the second support arm about the first pivot axis.

Example 5 is the conveyor support system of any or all previous examples wherein the conveyor assembly is mounted to the second support arm so that when the first actuator drives movement of the second end of the first support arm from the raised, transport position to the lowered position, the first portion of the conveyor assembly pivots relative to the second support arm about the second pivot axis.

Example 6 is the conveyor support system of any or all previous examples wherein the second support arm comprises:

a first elongate portion having a first end coupled to the frame of the agricultural vehicle and a second end; and a second elongate portion having a first end pivotally coupled to the second end of the first elongate portion and a second end pivotally coupled to the conveyor assembly.

Example 7 is the conveyor support system of any or all previous examples wherein the second actuator is connected to the second support arm to drive pivotal movement of the first elongate portion relative to the second elongate portion.

Example 8 is the conveyor support system of any or all previous examples and further comprising:

a third actuator connected to the first elongate portion and the frame of the agricultural vehicle to drive pivotal movement of the first elongate portion relative to the frame of the agricultural vehicle.

Example 9 is the conveyor support system of any or all previous examples and further comprising:

a first sensor configured to sense a position of the conveyor assembly relative to the first pivot axis and to generate a first sensor signal indicative of the sensed position; and a second sensor configured to sense a position of the conveyor assembly relative to the second pivot axis and to generate a second sensor signal indicative of the sensed position.

Example 10 is the conveyor support system of any or all previous examples and further comprising:

a third sensor configured to sense a position of the first and second elongate portions of the second support arm relative to one another and to generate a third sensor signal indicative of the sensed position.

Example 11 is the conveyor support system of any or all previous examples and further comprising:

a fourth sensor configured to sense a position of the first elongate portion relative to the frame of the agricultural vehicle and to generate a fourth sensor signal indicative of the sensed position.

Example 12 is the conveyor support system of any or all previous examples and further comprising:

an automated position control system configured to automatically control the second and third actuator and the motor to position the conveyor assembly, about the first pivot axis to a pre-defined position, based on the second sensor signal, the third sensor signal, and the fourth sensor signal.

Example 13 is the conveyor support system of any or all previous examples wherein the automated position control system is configured to automatically control the first actuator to position the conveyor assembly, about the second pivot axis to a pre-defined position, based on the first sensor signal.

Example 14 is the conveyor support system of any or all previous examples and further comprising:

a pre-defined position configuration system configured to receive operator inputs and control the first, second and third actuators and the motor to move the conveyor assembly to the pre-defined position, to detect and save values of the first, second, third and fourth sensor signals corresponding to the pre-defined position.

Example 15 is the conveyor support system of any or all previous examples wherein the predefined position comprises one of a fill position and a cleanout position in which the conveyor assembly is positioned to fill and clean out, respectively, a tank on the agricultural vehicle.

Example 16 is an agricultural vehicle, comprising:

a frame;

a tank that has an inlet opening and an outlet opening and that is configured to hold material;

a conveyor assembly that conveys material relative to the tank on the agricultural vehicle;

a first support arm having a first end coupled to the frame and having a second end that removably engages a first portion of the conveyor assembly;

a first actuator that moves the second end of the first support arm between a raised, transport position and a lowered position;

a second support arm having a first end coupled to the frame and a second end pivotally coupled to a second portion of the conveyor assembly, the conveyor assembly being pivotal relative to the second support arm, in a first direction, about a first pivot axis and in a second direction, about a second pivot axis;

a second actuator that moves the second end of the second support arm between a retracted, transport position, in which the second end of the second support arm is closely proximate the agricultural vehicle, and a deployed position in which the second end of the second support arm is further spaced from the agricultural vehicle than when in the retracted, transport position;

a ground engaging element coupled to the first portion of the conveyor assembly and, when the first actuator moves the second end of the first support arm to the lowered position, the ground engaging element engages a support surface; and a motor coupled to drive the ground engaging element in a drive direction, when the ground engaging element is in contact with the support surface, so the first portion of the conveyor assembly disengages from second end of the first support arm.

Example 17 is the agricultural vehicle of any or all previous examples wherein the conveyor assembly comprises:

a material receiving hopper coupled to the first portion of the conveyor assembly; and an outlet end, and wherein the conveyor assembly conveys the material generally along an elongate axis from the material receiving hopper to the outlet end, and wherein the ground engaging element is mounted to the first portion of the conveyor assembly so the drive direction is generally transverse to the elongate axis.

Example 18 is the agricultural vehicle of any or all previous examples wherein, when the motor drives movement of the ground engaging element in the drive direction, the ground engaging element drives pivotal movement of the conveyor assembly relative to the second support arm about the first pivot axis.

Example 19 is the agricultural vehicle of any or all previous examples wherein the conveyor assembly is mounted to the second support arm so that when the first actuator drives movement of the second end of the first support arm from the raised, transport position to the lowered position, the first portion of the conveyor assembly pivots relative to the second support arm about the second pivot axis.

Example 20 is A conveyor system, comprising:

a conveyor assembly having a material receiving hopper and an outlet end and that conveys material generally along an elongate axis from the material receiving hopper to the outlet end;

a first support arm having a first end coupled to a frame of an agricultural vehicle and having a second end that removably engages a first portion of the conveyor assembly;

a first actuator that moves the second end of the first support arm between a raised, transport position and a lowered position;

a second support arm having a first end coupled to the frame of the agricultural vehicle and a second end pivotally coupled to a second portion of the conveyor assembly, the conveyor assembly being pivotal relative to the second support arm, in a first direction, about a first pivot axis and in a second direction, about a second pivot axis;

a second actuator that moves the second end of the second support arm between a retracted, transport position, in which the second end of the second support arm is closely proximate the agricultural vehicle, and a deployed position in which the second end of the second support arm is further spaced from the agricultural vehicle than when in the retracted, transport position;

a ground engaging element coupled to the first portion of the conveyor assembly and, when the first actuator moves the second end of the first support arm to the lowered position, the ground engaging element engages a support surface; and a motor coupled to drive the ground engaging element in a drive direction, when the ground engaging element is in contact with the support surface, so the first portion of the conveyor assembly disengages from second end of the first support arm and wherein, when the motor drives movement of the ground engaging element in the drive direction, the ground engaging element drives pivotal movement of the conveyor assembly relative to the second support arm about the first pivot axis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A conveyor support system, comprising:
    a first support arm having a first end coupled to a frame of an agricultural vehicle and having a second end that removably engages a first portion of a conveyor assembly that conveys material relative to a tank on the agricultural vehicle;
    a first actuator that moves the second end of the first support arm between a raised, transport position and a lowered position;
    a second support arm having a first end coupled to the frame of the agricultural vehicle and a second end pivotally coupled to a second portion of the conveyor assembly, the conveyor assembly being pivotal relative to the second support arm, in a first direction, about a first pivot axis and in a second direction, about a second pivot axis;
    a second actuator that moves the second end of the second support arm between a retracted, transport position, in which the second end of the second support arm is closely proximate the agricultural vehicle, and a deployed position in which the second end of the second support arm is further spaced from the agricultural vehicle than when in the retracted, transport position;
    a ground engaging element coupled to the first portion of the conveyor assembly and, when the first actuator moves the second end of the first support arm to the lowered position, the ground engaging element engages a support surface; and
    a motor coupled to drive the ground engaging element in a drive direction, when the ground engaging element is in contact with the support surface, so that the first portion of the conveyor assembly disengages from the second end of the first support arm.

2. The conveyor support system of claim 1 and further comprising:
    a material receiving hopper coupled to the first portion of the conveyor assembly.

3. The conveyor support system of claim 2 wherein the conveyor assembly comprises an outlet end and conveys the material generally along an elongate axis from the material receiving hopper to the outlet end, and wherein the ground engaging element is mounted to the first portion of the conveyor assembly so that the drive direction is generally transverse to the elongate axis.

4. The conveyor support system of claim 3 wherein, when the motor drives movement of the ground engaging element in the drive direction, the ground engaging element drives pivotal movement of the conveyor assembly relative to the second support arm about the first pivot axis.

5. The conveyor support system of claim 4 wherein the conveyor assembly is mounted to the second support arm so that when the first actuator drives movement of the second end of the first support arm from the raised, transport position to the lowered position, the first portion of the conveyor assembly pivots relative to the second support arm about the second pivot axis.

6. The conveyor support system of claim 5 wherein the second support arm comprises:
    a first elongate portion having a first end coupled to the frame of the agricultural vehicle and a second end; and a second elongate portion having a first end pivotally coupled to the second end of the first elongate portion and a second end pivotally coupled to the conveyor assembly.

7. The conveyor support system of claim 6 wherein the second actuator is connected to the second support arm to drive pivotal movement of the first elongate portion relative to the second elongate portion.

8. The conveyor support system of claim 7 and further comprising:
a third actuator connected to the first elongate portion and the frame of the agricultural vehicle to drive pivotal movement of the first elongate portion relative to the frame of the agricultural vehicle.

9. The conveyor support system of claim 7 and further comprising:
a first sensor configured to sense a position of the conveyor assembly relative to the first pivot axis and to generate a first sensor signal indicative of the sensed position; and
a second sensor configured to sense a position of the conveyor assembly relative to the second pivot axis and to generate a second sensor signal indicative of the sensed position.

10. The conveyor support system of claim 9 and further comprising:
a third sensor configured to sense a position of the first and second elongate portions of the second support arm relative to one another and to generate a third sensor signal indicative of the sensed position.

11. The conveyor support system of claim 10 and further comprising:
a fourth sensor configured to sense a position of the first elongate portion relative to the frame of the agricultural vehicle and to generate a fourth sensor signal indicative of the sensed position.

12. The conveyor support system of claim 11 and further comprising:
an automated position control system configured to automatically control the second and third actuator and the motor to position the conveyor assembly, about the first pivot axis to a pre-defined position, based on the second sensor signal, the third sensor signal, and the fourth sensor signal.

13. The conveyor support system of claim 12 wherein the automated position control system is configured to automatically control the first actuator to position the conveyor assembly, about the second pivot axis to a pre-defined position, based on the first sensor signal.

14. The conveyor support system of claim 10 and further comprising:
a pre-defined position configuration system configured to receive operator inputs and control the first, second and third actuators and the motor to move the conveyor assembly to the pre-defined position, to detect and save values of the first, second, third and fourth sensor signals corresponding to the pre-defined position.

15. The conveyor support system of claim 14 wherein the predefined position comprises one of a fill position and a cleanout position in which the conveyor assembly is positioned to fill and clean out, respectively, a tank on the agricultural vehicle.

16. An agricultural vehicle, comprising:
a frame;
a tank that has an inlet opening and an outlet opening and that is configured to hold material;
a conveyor assembly that conveys material relative to the tank on the agricultural vehicle;
a first support arm having a first end coupled to the frame and having a second end that removably engages a first portion of the conveyor assembly;
a first actuator that moves the second end of the first support arm between a raised, transport position and a lowered position;
a second support arm having a first end coupled to the frame and a second end pivotally coupled to a second portion of the conveyor assembly, the conveyor assembly being pivotal relative to the second support arm, in a first direction, about a first pivot axis and in a second direction, about a second pivot axis;
a second actuator that moves the second end of the second support arm between a retracted, transport position, in which the second end of the second support arm is closely proximate the agricultural vehicle, and a deployed position in which the second end of the second support arm is further spaced from the agricultural vehicle than when in the retracted, transport position;
a ground engaging element coupled to the first portion of the conveyor assembly and, when the first actuator moves the second end of the first support arm to the lowered position, the ground engaging element engages a support surface; and
a motor coupled to drive the ground engaging element in a drive direction, when the ground engaging element is in contact with the support surface, so that the first portion of the conveyor assembly disengages from the second end of the first support arm.

17. The agricultural vehicle of claim 16 wherein the conveyor assembly comprises:
a material receiving hopper coupled to the first portion of the conveyor assembly; and
an outlet end, and wherein the conveyor assembly conveys the material generally along an elongate axis from the material receiving hopper to the outlet end, and wherein the ground engaging element is mounted to the first portion of the conveyor assembly so that the drive direction is generally transverse to the elongate axis.

18. The agricultural vehicle of claim 17 wherein, when the motor drives movement of the ground engaging element in the drive direction, the ground engaging element drives pivotal movement of the conveyor assembly relative to the second support arm about the first pivot axis.

19. The agricultural vehicle of claim 17 wherein the conveyor assembly is mounted to the second support arm so that when the first actuator drives movement of the second end of the first support arm from the raised, transport position to the lowered position, the first portion of the conveyor assembly pivots relative to the second support arm about the second pivot axis.

20. A conveyor system, comprising:
a conveyor assembly having a material receiving hopper and an outlet end and that conveys material generally along an elongate axis from the material receiving hopper to the outlet end;
a first support arm having a first end coupled to a frame of an agricultural vehicle and having a second end that removably engages a first portion of the conveyor assembly;
a first actuator that moves the second end of the first support arm between a raised, transport position and a lowered position;

a second support arm having a first end coupled to the frame of the agricultural vehicle and a second end pivotally coupled to a second portion of the conveyor assembly, the conveyor assembly being pivotal relative to the second support arm, in a first direction, about a first pivot axis and in a second direction, about a second pivot axis;

a second actuator that moves the second end of the second support arm between a retracted, transport position, in which the second end of the second support arm is closely proximate the agricultural vehicle, and a deployed position in which the second end of the second support arm is further spaced from the agricultural vehicle than when in the retracted, transport position;

a ground engaging element coupled to the first portion of the conveyor assembly and, when the first actuator moves the second end of the first support arm to the lowered position, the ground engaging element engages a support surface; and a motor coupled to drive the ground engaging element in a drive direction, when the ground engaging element is in contact with the support surface, so that the first portion of the conveyor assembly disengages from the second end of the first support arm and wherein, when the motor drives movement of the ground engaging element in the drive direction, the ground engaging element drives pivotal movement of the conveyor assembly relative to the second support arm about the first pivot axis.

* * * * *